Andrews & Kalbach

Water Wheel,

No. 1,259. Reissued Jan. 14, 1862.

Witnesses:
Thos. D. Huffman
E. Cohen

Inventors:
Abraham Andrews
Harrison Kalbach

UNITED STATES PATENT OFFICE.

HARRISON KALBACH AND MARY ANDREWS, OF BERNVILLE, PENNSYLVANIA, ADMINISTRATRIX OF ABRAHAM ANDREWS, DECEASED.

IMPROVEMENT IN HORIZONTAL WATER-WHEELS.

Specification forming part of Letters Patent No. 25,237, dated August 30, 1859; Reissue No. 1,259, dated January 14, 1862.

*To all whom it may concern:*

Be it known that we, HARRISON KALBACH and MARY ANDREWS, both of Bernville, in the county of Berks and State of Pennsylvania, do hereby declare that ABRAHAM ANDREWS and HARRISON KALBACH, of Bernville aforesaid, did obtain Letters Patent of the United States for certain new and useful Improvements in Water-Wheels, said Letters Patent bearing date August 30, 1859; and that we, HARRISON KALBACH, aforesaid, and MARY ANDREWS, acting executrix of ABRAHAM ANDREWS, aforesaid, deceased, do, for the purpose of obtaining a reissue of said Letters Patent, hereby declare that the following is a full, clear, and exact description of the improvements in water-wheels patented as above alluded to, reference being had to the accompanying drawings, making a part of this specification, in which—

Figure 1:
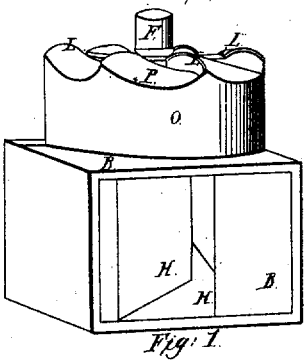
Figure 2:
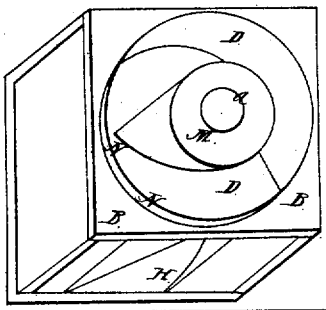
Figure 3:
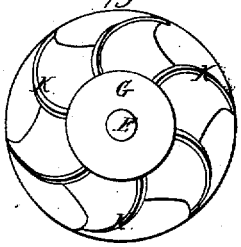

Figure 1 is a perspective view of the water-wheel; Fig. 2, a perspective view of the stationary guide-wheel, through which the water passes before it reaches the water-wheel; Fig. 3, a bottom view of the water-wheel, and Fig. 4 a vertical central section through the entire apparatus.

The nature of this invention relates to the peculiar construction of the buckets of a horizontal water-wheel, by means of which a greater effect of the water is obtained than in wheels used heretofore.

The invention also relates to a spiral water-way or chamber in connection with the buckets aforesaid.

To enable those skilled in the art to fully understand and construct the invention, we will proceed to describe it.

A represents a rectangular box, which is closed at the top and side and open only at the bottom. The water-wheel is mounted within this box, which is connected in the usual manner with the flume of the water-works. B represents a frame-work, which is secured to the opposite sides of the box A in such a manner as to leave a space, R, between it and the two other sides of the box A, through which the waste water is to escape. D represents the spiral water way or inlet, which is secured within the frame B. The shape of this inlet or water-way is represented at Fig. 2. It consists substantially in a helix-shaped conduit, D, which is secured between the inner cylinder, M, and the outer cylinder, N, and the inclination of said conduit is such as to cause the water to strike the buckets of the wheel in a direction which will result in the greatest possible effect of the water.

O represents the water-wheel. It is secured to the hub G, the pivot E of which runs in the step *a* of the cylinder M. The buckets of the wheel are of such a shape as to present a concave surface to the action of every particle of water which strikes them. In this way it is believed that the water will act on every point of the bucket in a perpendicular direction, and therefore exert a greater pressure on the same than when impinging thereon in an oblique direction. The shape of the buckets will be seen by the drawings. Their lower edge, K, is a curve, and the bucket P itself is also curved in its longitudinal direction; therefore every element of the bucket must be of a curved shape, as above described.

The operation of the water-wheel is as follows: The water enters the spiral inlet D through the inlet H and passes up the incline D, where it is guided to strike the buckets of the water-wheel in the proper direction, where it acts upon said buckets in the manner above described, causing the wheel to rotate on its shaft F, and thence escaping from the buckets at their upper edges, L, and thence through the space R down into the waste-water flume.

Figure 4:
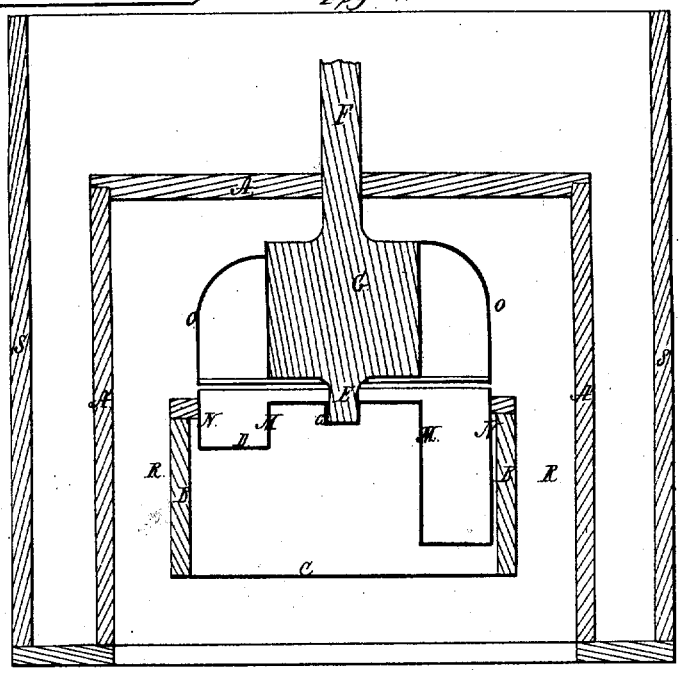

The tops as well as the bottoms of the buckets are curved or eccentric, and not radial, as usually made, and differ in this particular from the wheel patented by ABRAHAM ANDREWS on the 1st day of March, 1859. The draft-box, wheel, and its several appliances are arranged within the fore-bay S, which is open at top, as shown in Fig. 4, said fore-bay being of any of the ordinary forms of construction.

Having thus fully described the nature of the invention, what we claim as new, and desire to secure by Letters Patent, is—

1. The curved concave bucket having curved or eccentrically-formed tops and bottoms, as described.

2. In combination with the buckets, curved as described, the spiral water way or chamber underneath them, arranged within a box, A, substantially as shown and described.

HARRISON KALBACH.

her
MARY × ANDREWS,
mark.

*Acting Executrix of Abraham Andrews aforesaid, deceased.*

Witnesses:

ELISABETH KLEE,
SAMUEL M. KLEE.